US011051095B2

(12) United States Patent
Cramer et al.

(10) Patent No.: US 11,051,095 B2
(45) Date of Patent: Jun. 29, 2021

(54) CHARGING CASE WITH A BUILT-IN USB CABLE

(71) Applicant: Peag, LLC, Carlsbad, CA (US)

(72) Inventors: Winthrop Cramer, Carlsbad, CA (US); Justin Liu, San Diego, CA (US)

(73) Assignee: Peag, LLC, Carlsbad, CA (US)

( * ) Notice: Subject to any disclaimer, the term of this patent is extended or adjusted under 35 U.S.C. 154(b) by 324 days.

(21) Appl. No.: 16/359,082

(22) Filed: Mar. 20, 2019

(65) Prior Publication Data

US 2020/0304899 A1    Sep. 24, 2020

(51) Int. Cl.
*H02J 7/00* (2006.01)
*H04R 1/10* (2006.01)
*A45C 11/00* (2006.01)
*A45C 15/00* (2006.01)
*A45C 13/02* (2006.01)

(52) U.S. Cl.
CPC ............ *H04R 1/1025* (2013.01); *A45C 11/00* (2013.01); *A45C 13/02* (2013.01); *A45C 15/00* (2013.01); *H02J 7/0021* (2013.01); *H02J 7/0045* (2013.01); *A45C 2011/001* (2013.01)

(58) Field of Classification Search
USPC ................................. 320/106, 107, 108, 110
See application file for complete search history.

(56) References Cited

U.S. PATENT DOCUMENTS

| 9,210,498 | B1* | 12/2015 | Shaffer | H02J 7/342 |
|---|---|---|---|---|
| 2018/0077481 | A1* | 3/2018 | Kim | H04R 1/1016 |
| 2018/0091887 | A1* | 3/2018 | Minoo | H04R 1/1025 |
| 2019/0335868 | A1* | 11/2019 | Brzezinski | A45C 11/24 |
| 2020/0084532 | A1* | 3/2020 | Lo | H02J 7/342 |
| 2020/0233046 | A1* | 7/2020 | Ding | H02J 7/025 |
| 2020/0304895 | A1* | 9/2020 | Maguire | H04R 1/1041 |
| 2020/0304898 | A1* | 9/2020 | Cohen | H04R 1/1016 |
| 2020/0304900 | A1* | 9/2020 | Lalvani | H04R 1/1033 |
| 2021/0085047 | A1* | 3/2021 | Wright | A45C 13/02 |

* cited by examiner

*Primary Examiner* — Brian Ngo
(74) *Attorney, Agent, or Firm* — LambentIP

(57) ABSTRACT

A charging case for charging and storing a pair of earbuds is provided. The charging case comprises: a case body having an upper section and a lower section, the lower section housing at least a battery and a PCB, the upper section having a pair of sockets to accommodate the pair of earbuds, respectively; and a USB cable comprising a distal end portion including a USB connector, a cable body housing electrical wires coupled to the USB connector, and a proximal end portion non-removably attached to the case body. The electrical wires are guided through the housing wall into an inner space of the case body where end portions of the electrical wires are soldered onto the PCB. A recessed area is formed on the exterior surface of the case body to accommodate the attached USB cable while not in use.

12 Claims, 6 Drawing Sheets

CHARGING CASE WITH A BUILT-IN USB CABLE

BACKGROUND

Earbuds, earphones or headphones allow users to shut down surrounding noises and disturbances to enjoy hand-free audio listening. These modern-day speaker devices are generally designed to be mobile and/or wearable, and may wirelessly communicate with an audio source, such as a smartphone, a digital audio player (DAP), an MP3 player, a laptop or desktop computer, a tablet and other mobile communication devices. Such wireless speaker devices include "true wireless" earbuds (or earphones) that are configured to be a pair that can mutually communicate wirelessly to each other without physical links therebetween.

Wireless speaker devices, including earbuds that are "true wireless," are typically designed to power up by a rechargeable battery accommodated therein. The rechargeable battery needs to be charged up occasionally. For this reason, most manufacturers of wireless earbuds provide a charging case specifically designed for charging the rechargeable batteries included in the pair of earbuds. The charging case typically includes a larger rechargeable battery, which in turn needs to be charged up occasionally. For this reason, such a charging case is typically provided with a removable USB (Universal Serial Bus) cable to be connected for charging the battery in the charging case and to be removed and stored away while not in use.

In today's market, USB 3.0 is a major version of the USB standard for interface, communication and power supply between computers and electronic devices, with a data transfer speed up to 5 Gbits/sec and a voltage up to 5V. USB Type refers to the physical shape and wiring of the ports and plugs. On a standard USB cable, a USB Type-A connector, a.k.a. a Type-A male connector, goes into a host. A USB port where the Type-A male connector is inserted into is referred to as a Type-A female port. Type-A female ports are typically installed in host devices, such as laptop or desktop computers, game consoles, media players, etc. Generally, a Type-B male connector is attached at the other end of the standard USB cable that plugs into a peripheral device such as a printer, a mobile phone, a headphone, Kindle®, etc. The port on the peripheral device to receive the Type-B male connector is referred to as a Type-B female port.

There are a wide variety of peripheral devices in sizes, power levels and speeds; accordingly, the USB connector and its companion port for a peripheral device also come in different designs. To this day, the USB Type-B connectors/plugs include: the original Standard-B, Mini-B and Micro-B. The Standard-B is typically used for large peripheral devices, e.g., printers or scanners. The Mini-B ports, which are smaller than the Standard-B, can be found in older portable devices, e.g., digital cameras, large-size headphones, etc., and are becoming obsolete. The Micro-B is even smaller than the Mini-B, and typically used for smartphones and tablets at present. The Micro-B port can be placed on a PCB (Printed Circuit Board) in a peripheral device using an SMT (Surface Mount Technology) process. The next step of the USB technology is said to involve Type-C ports and connectors. The USB Type-C cable has both ends identical, allowing for reversible plugging direction with either end connectable to a host or a peripheral device.

Examples of modern-day small-size peripheral devices include a charging case for charging rechargeable batteries included in a pair of wireless earbuds. As mentioned earlier, the charging case typically includes a larger rechargeable battery, which in turn needs to be charged up occasionally. A conventional charging case is provided with a removable USB cable to be connected for charging the battery in the charging case and to be removed and stored away while not in use. The removable USB cable may be designed to be usable for both a smartphone and a charging case so that only one removable USB cable is needed for charging either of them. Such a conventional removable USB cable includes: a Type-A connector (male) at one end to be inserted into a corresponding Type-A port (female) in a host device such as a laptop or desktop computer, and a Micro-B connector (male) at the other end to be inserted into a corresponding Micro-B port (female) in a smartphone or a charging case, where the Type-B port (female) may be surface-mounted on a PCB therein. To use the conventional removable USB cable, a user is required to perform multiple steps including at least: (i) check the cable to see which end is A or B; (2) check A to see which side is top or bottom; (3) insert A to A of the host device with the proper top and bottom orientation; (4) check B to see which side is top or bottom; and (3) insert B to B of the peripheral device with the proper top and bottom orientation.

Many users of mobile devices, seasoned or new, have found that the charging procedure using a removable USB cable involves too many steps, thereby being cumbersome in today's fast pace daily life. In view of the inconvenience felt by general users, this document discloses a new type of charging case for earbuds that is designed to simplify the charging procedure on the part of users.

DETAILED DESCRIPTION

In view of the inconvenience felt by general users in using a conventional removable USB cable, this document describes a new type of charging case designed to include a built-in USB cable, which offers a simplified procedure for charging a rechargeable battery in the charging case, which is designed to store and charge a pair of earbuds. Details of the present charging case are explained below with reference to accompanying drawings.

Figure 1:
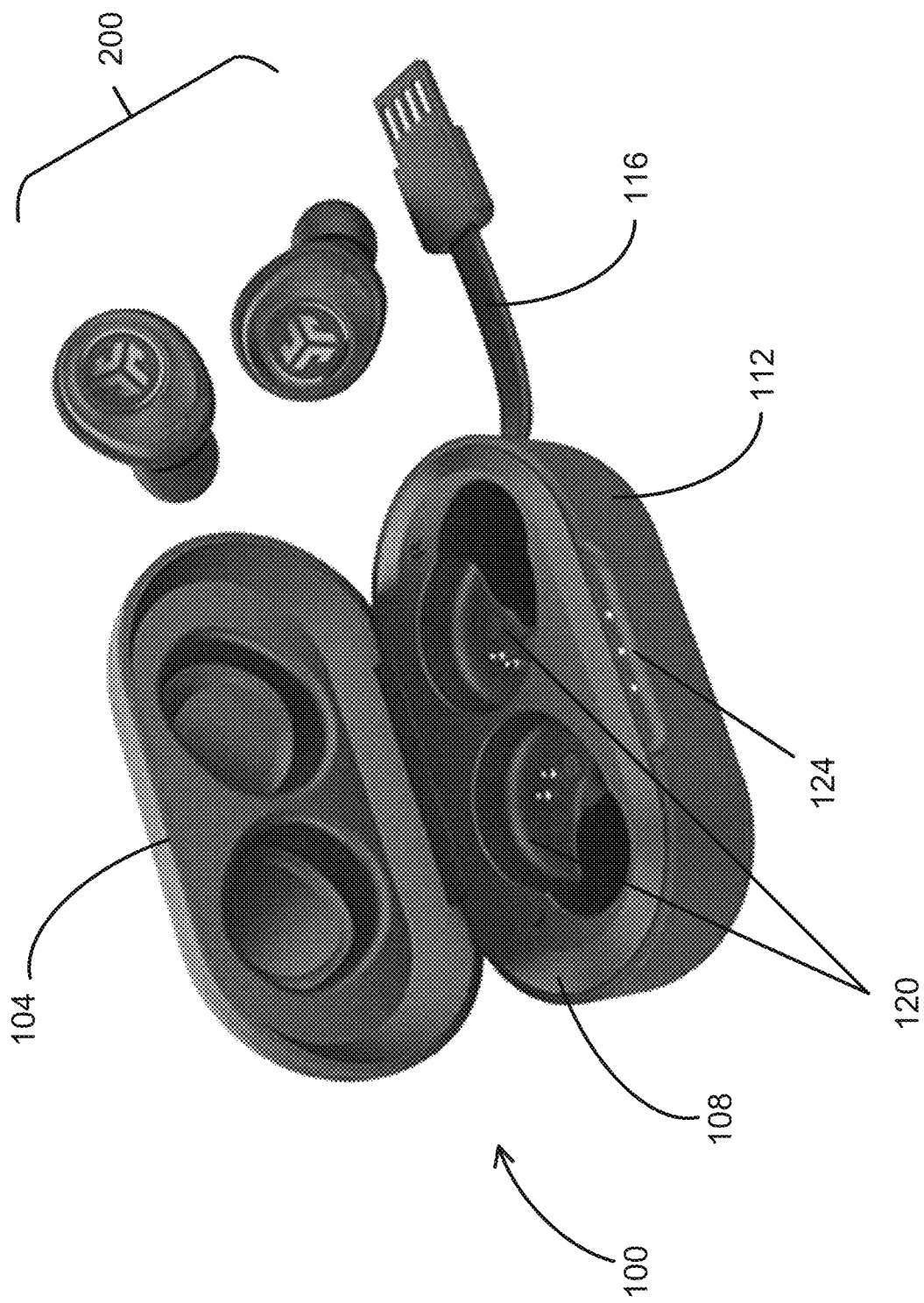
FIG. 1 is a photo of an example of a product set comprising a charging case and a pair of wireless earbuds.

FIG. 1 is a photo of an example of a product set comprising a charging case 100 and a pair of wireless earbuds 200. The charging case 100 is designed to accommodate the pair of earbuds 200 for charging a pair of rechargeable batteries included therein, respectively. The charging case 100 comprises a top cover 104, a case body having an upper section 108 and a lower section 112, and a built-in USB cable 116 that is non-detachably attached, i.e., non-removably attached, to the lower section 112 of the case body. One edge portion of the top cover 104 is attached to one edge portion of the upper section 108 of the case body. A hinge may be used for the attachment means so that the top cover 104 can be open and closed over the upper section 108 of the case body, without losing each other. The top surface of the upper section 108 is formed to have a pair of sockets 120 to accommodate the pair of earbuds 200 for charging and storage. The lower section 112 of the case body houses a battery, a PCB mounted with an electrical circuit configured to perform at least power management and charging functions, electrical wires, mechanical fasteners and fixtures, etc., all of which are not visible in this photo. Multiple charging pins are coupled to the PCB coupled to the battery in the lower section 112 of the case body; and end portions of the multiple pins protrude into the sockets 120 to be used for charging the earbuds upon contact with corresponding charging pins included in the pair of earbuds 200. In this example, the lower section 112 of the case body has multiple LED lights 124 guided from LEDs mounted on the PCB therein. The LED lights 124 may be configured to indicate the power status when the top cover 104 is opened. For example, these lights may be configured to light up one color (e.g., white) to show how much power is left with the battery in the charging case 100, e.g., one LED=Low, two LEDs=Medium, three LEDs=High/Full. Furthermore, the left and right LED lights may be configured to shine another color (e.g., blue) while the left and right earbuds, respectively, are still charging. Once either of the earbuds is fully charged, the corresponding LED light (left or right) will turn off.

The built-in USB cable 116 has two end portions: one end portion is non-detachably attached, i.e., non-removably attached, to the lower section 112 of the case body and electrically coupled to the electrical circuitry on the PCB, thereby being a proximal end portion; and the other end portion, i.e., a distal end portion, has a USB connector (male) to be plugged into a corresponding USB port (female) installed in a host device such as a laptop or desktop computer, a game console, a media player, etc., which can supply power to the charging case 100. Since today's general users are accustomed to the action of inserting a Type-A connector into a Type-A port typically installed in a laptop or desktop computer, a Type-A may be a USB connector of choice at present as a connecting means to a host device. However, as the USB technology advances, the built-in USB cable 116 can be easily redesigned to include a different type of USB connector, e.g., Type-C, as conceived by those skilled in the art. Because of having the built-in USB cable 116 as an integrated part of the charging case 100, the steps that should be performed by a user for charging the battery in the charging case 100 involves only plugging the USB connector head of the USB cable 116 into a corresponding USB port of a host device he/she is using, without having to inspect the two ends of the USB cable to see which end should be plugged to the host or to the charging case. Additionally, the distal end portion of the present built-in USB cable 116 can be configured to include a double-sided reversible USB Type-A connector, which is designed to have the identical top and bottom sides so that the USB connector can be inserted with either side facing top or bottom with respect to the USB port, whereby the user can further simplify the plugging step by bypassing the guesswork about the orientation of the plug head.

Figure 2:
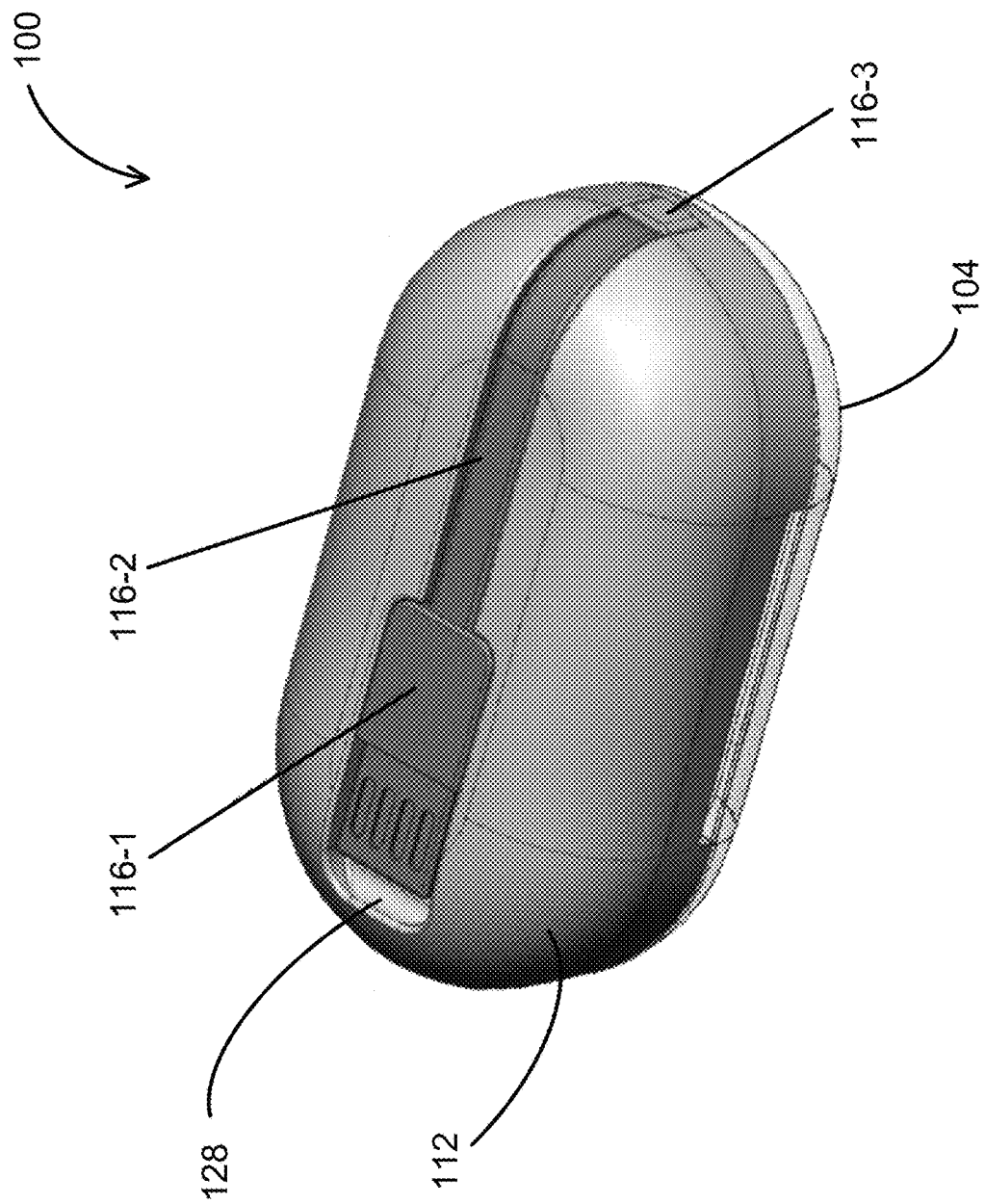
FIG. 2 illustrates a perspective view looking from the bottom side of the charging case.

FIG. 2 illustrates a perspective view looking from the bottom side of the charging case 100. The exterior of the lower section 112 of the case body is formed to have a recessed area 128 on the bottom surface and on the side surface contiguously, to store the built-in USB cable 116 when it is not in use. Alternatively, the recessed area 128 may be formed horizontally on the exterior side surface only or on the exterior bottom surface only. Furthermore, the recessed area 128 may be formed to extend to the exterior of the upper section 108 of the case body. The built-in USB cable 116 comprises: a distal end portion 116-1 having a USB connector (male) that houses multiple connector pins, a metal shell, a PCB mounted with an electrical circuitry required for performing USB functions; a cable body 116-2 that houses multiple electrical wires coupled to the USB connector to conduct electricity; and a proximal end portion 116-3 that is non-detachably, i.e., non-removably, attached to the case body so as to guide the wires through the housing wall of the case body toward an inner space therein. In FIG. 1, the built-in USB cable 116 is shown in an extended position, in which the proximal end portion 116-3 is fixed at the lower section 112 of the case body and the other portions, i.e., the distal end portion 116-1 and the cable body 116-2, are removed from the recessed area 128 to direct the USB connector outwardly to be inserted into the corresponding USB port of a host device. On the other hand, in FIG. 2, the built-in cable 116 is shown in a folded position, in which the distal end portion 116-1 and the cable body 116-2 are folded along the exterior surface of the lower section 112 of case body and tucked into the recessed area 128 for storage. In the present example, the plug head of the distal end portion 116-1 is formed based on hard plastic molding; the cable body 116-2 is formed using a flexible material, e.g., thermoplastic polyurethane (TPU) or thermoplastic elastomers (TPE), as a surrounding cover to protect the wires housed therein. Furthermore, the present proximal end portion 116-3 includes a strain relief (SR) element formed based on plastic molding, e.g., acrylonitrile butadiene styrene (ABS) or other hard plastic materials. Thus, the SR element is formed to protect internal elements in the proximal end portion 116-3 against mechanical stress exerted from the movement of the flexible cable body 116-2.

In the present example, the recessed area 128 is formed on the exterior bottom surface and on the exterior side surface contiguously, of the lower section 112 of the case body, and is shaped as a groove with dimensions that allow the distal end portion 116-1 and the cable body 116-2 to fit in, allowing for folding and storing the built-in USB cable 116 while not in use. Here, the exposed outer surfaces of the distal end portion 116-1 and the cable body 116-2 are flush with or lower than the exterior surface of the case body around the recessed area 128, so that the bottom of the case body can sit on a flat surface without spinning or rocking when the built-in USB cable 116 is accommodated in the recessed area 128.

Figure 3:
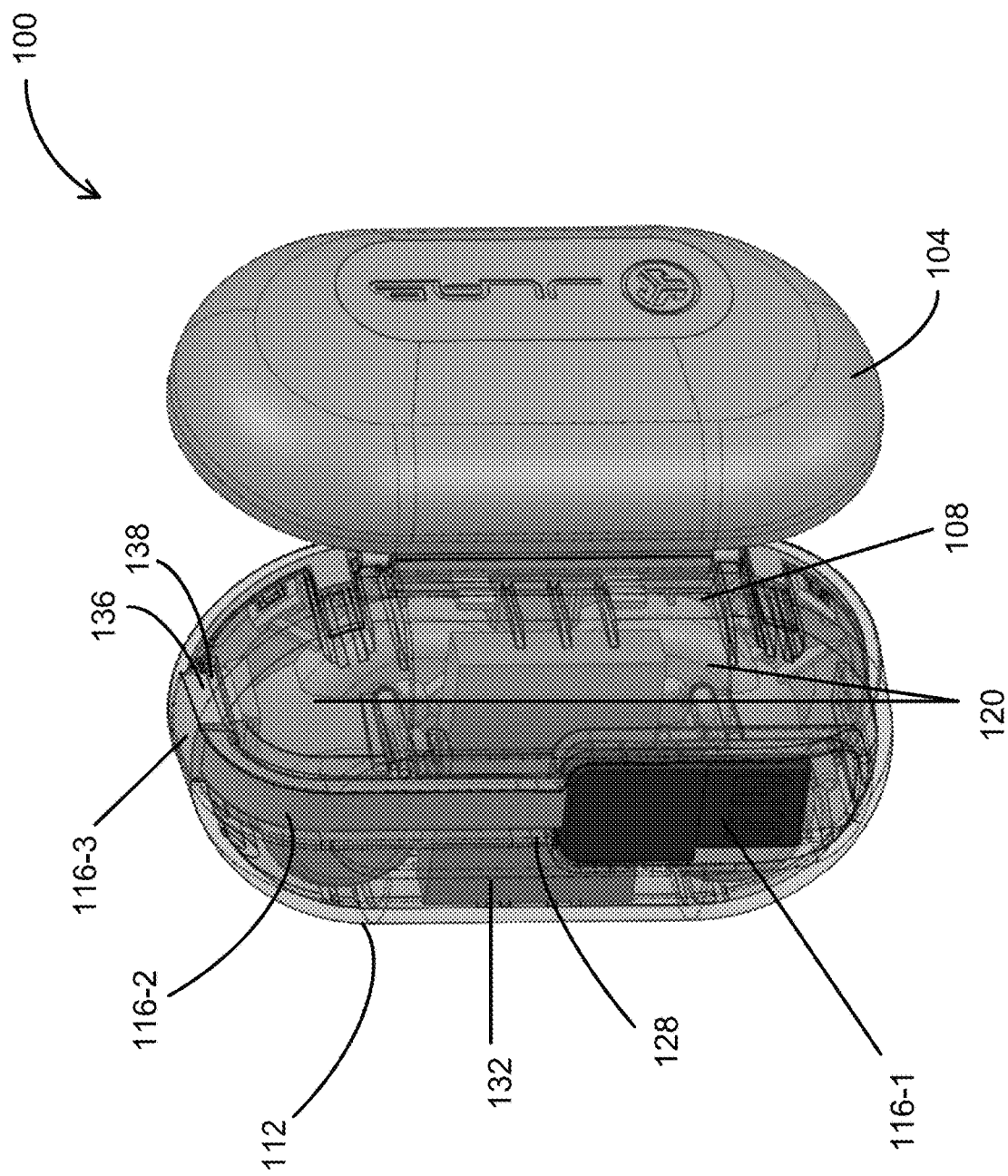
FIG. 3 illustrates another perspective view looking from the bottom side of the charging case, showing the internal mechanical configuration.

FIG. 3 illustrates another perspective view looking from the bottom side of the charging case 100, showing the internal mechanical configuration in a transparent mode. The PCB and other electrical parts and wirings are omitted in this figure for clarity. The sockets 120 for accommodating the pair of earbuds 200 are formed in the upper section 108 of the case body, which is attached to one edge portion of the top cover 104 via a hinge, in this example. A battery 132 is housed on the internal bottom surface of the lower section 112 of the case body. The built-in USB cable 116 is in the folded position to stay in the recessed area 128 in this figure. The proximal end portion 116-3 includes the SR element, explained earlier with reference to FIG. 2, which comprises a patch section 136 and a flange section 138, which may be formed contiguously to each other based on plastic molding using hard plastic.

Figure 4A:
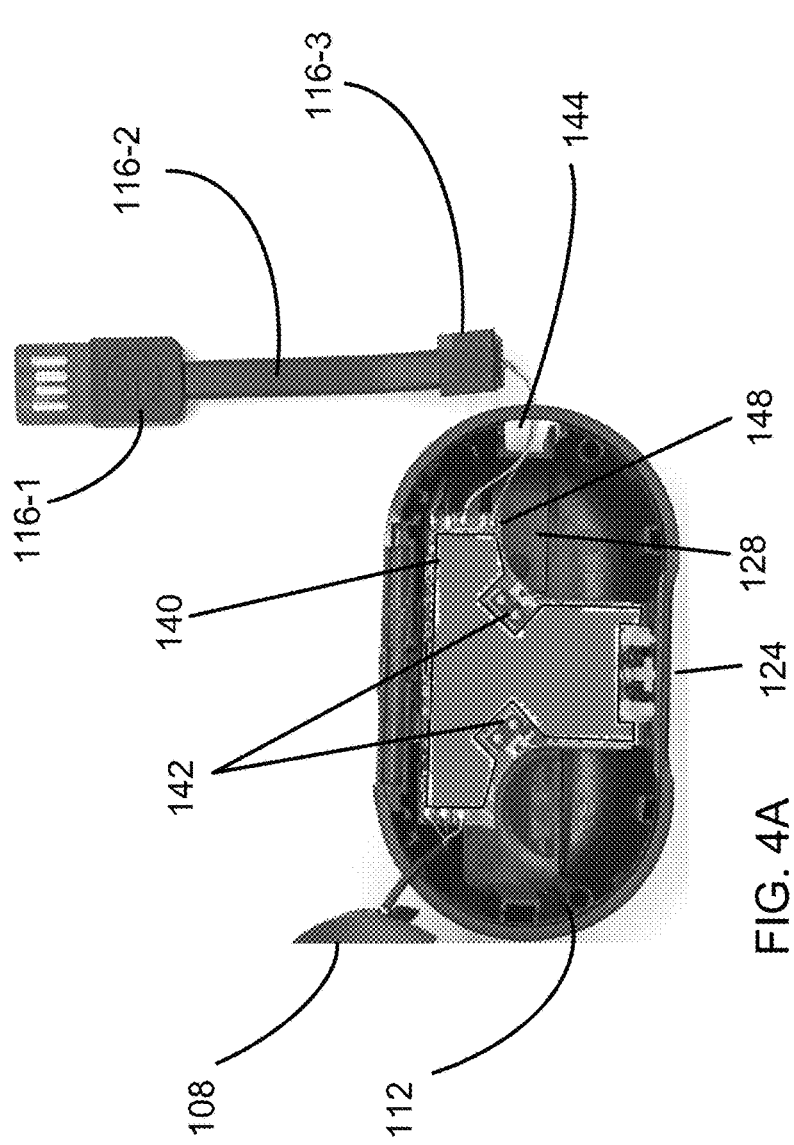
FIGS. 4A-4E are photos showing key steps of an assembly process of the charging case having the built-in USB cable.

FIGS. 4A-4E are photos showing key steps of an assembly process of the charging case 100 having the built-in USB cable 116. FIG. 4A includes reference numerals representing the parts associated with the charging case 100; and some of the reference numerals are omitted in FIGS. 4B-4E. However, it should be understood that the same references numerals represent the same corresponding parts in the figures and the textual descriptions in this document. The details of the circuitry on the PCB 140 housed in the lower section 112 of the case body are obscured, except for the edge portions, in FIGS. 4A and 4B by a polygonal mask, which forms no part of the embodiment.

FIG. 4A is a photo showing a top view of the charging case 100, wherein the top cover 104 is detached and moved away from this photo for clarity, and the upper section 108 of the case body is detached from the lower section 112 but is coupled to the PCB 140 therein via wires. These wires may be configured to electronically couple the PCB 140 to a sensor to detect if the top cover 104 is opened or closed by a user. In this configuration, when the top cover 104 is opened, the signals detected by the sensor can be transmitted to the circuitry on the PCB 140 to light up the LED lights 124, so as to show approximately how much power is left in the battery 132, for example. The battery 132, shown in FIG. 3, is disposed underneath the PCB 140 and thus cannot be seen in FIG. 4A. As shown in this top view of the charging case 100 with the upper section 108 being detached from the lower section 112 of the case body, the charging pins 142 are disposed with the PCB 140 at the circular edge portions and configured to protrude from below into the sockets 120 that are shaped and dimensioned to accommodate the pair of earbuds 200, as seen in FIG. 1. The present top view also shows that the inner surface of the recessed area 128, which is formed on the bottom surface and on the side surface contiguously, of the lower section 112 of the case body, and is shaped to be a groove with dimensions that allow the distal end portion 116-1 and the cable body 116-2 to fit in for accommodating the USB cable 116 for storage while not in use. As mentioned earlier, alternatively to the above configuration, the recessed area 128 may be formed horizontally on the exterior side surface only or on the exterior bottom surface only. Furthermore, the recessed area 128 may be formed to extend to the exterior of the upper section 108 of the case body as well. That is, the recesses area 128 can be formed on the exterior surface of the case body, and configured to have the shape and dimensions predetermined according to the overall sizes of the case 100 and the UBS cable 116. Note also that in the assembly process for the present charging case 100 having the built-in USB cable 116, the SR element is already formed by plastic molding as part of the proximal end portion 116-3, prior to the attachment to the case body.

In the assembly step depicted in FIG. 4A, the wires extending out from the proximal end portion 116-3 are guided through an opening 144 formed in a side wall of the lower section 112 of the case body toward an inner space; and the end portions of the wires are soldered onto the PCB 140 at one edge portion 148. The opening 144 can be formed in the housing wall of the case body at a location adjacent to the recesses area 128, which can be formed on the exterior surface of the case body and configured to have the shape and dimensions predetermined according to the overall sizes of the case 100 and the UBS cable 116.

Figure 4B:
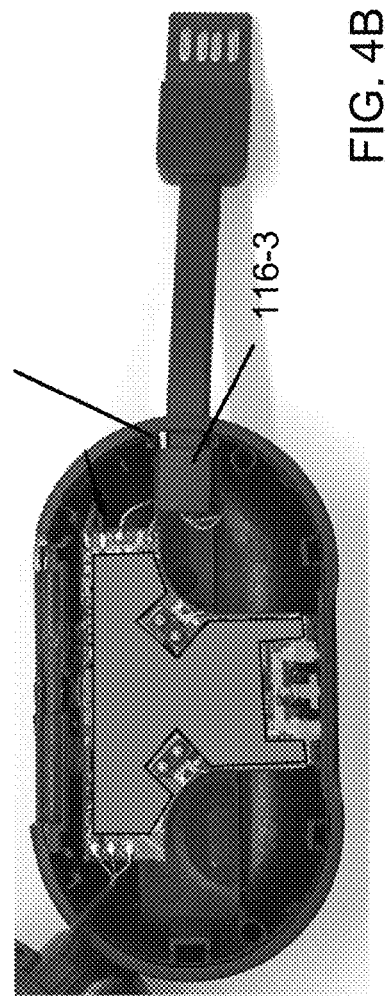

In the next step depicted in FIG. 4B, the entire proximal end portion 116-3 is inserted through the opening 144 and placed in the inner space within the case body.

Figure 4C:
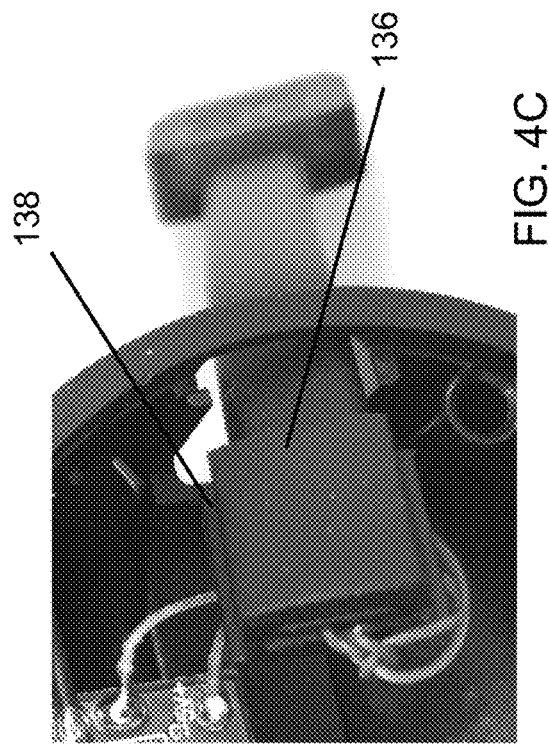

In the next step depicted in FIG. 4C, the USB cable 116 is pivoted around the opening 144. As mentioned earlier with reference to FIG. 3, the proximal end portion 116-3 includes the SR element comprising the patch section 136 and the flange section 138, which are formed contiguously to each other based on plastic molding using hard plastic. At least one dimension, e.g., the width in this example, of the flange section 138 is configured to be larger than the corresponding dimension of the patch section 136 and that of the opening 144.

Figure 4D:
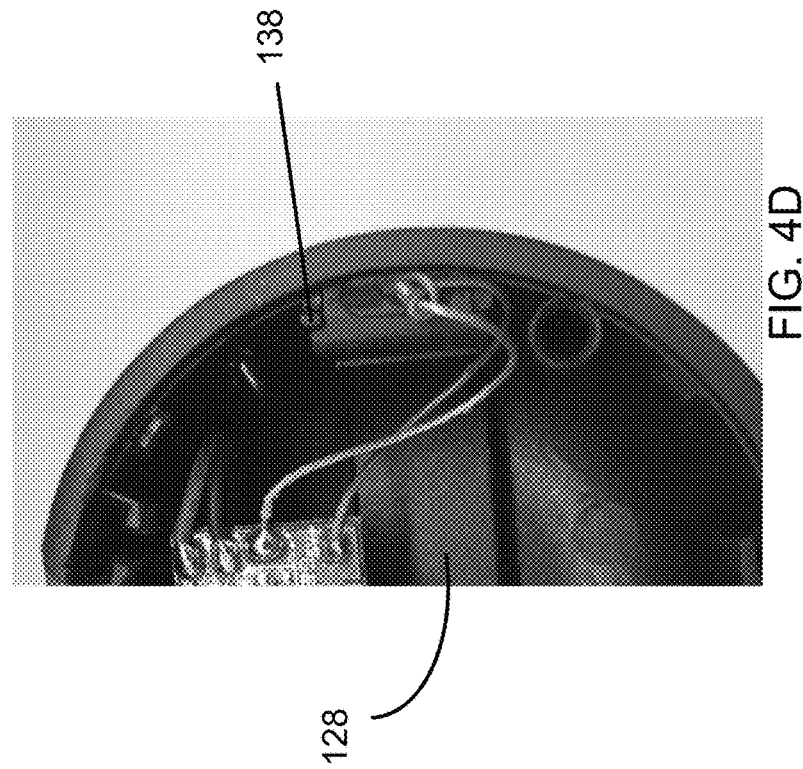

In the next step depicted in FIG. 4D, the proximal end portion 116-3 is oriented so that the end of the proximal end portion 116-3 where the wires extend out points upward; and the patch section 136 facing the opening 144 is snapped fit in the opening 144. The shape and dimensions of the patch section 136 are configured to fit in the opening 144; whereas at least one dimension, e.g., the width, of the flange section 138 is configured to be larger than the corresponding dimension, e.g., the width, of the patch section 136, hence the corresponding dimension of the opening 144, so as to retain the flange section 138 in the inner space against the inner surface of the case body around the opening 144 while the patch section 136 is fit and positioned in the opening 144. The proximal end portion 116-3 is thus attached to the case body, while the distal end portion 116-1 and the cable body 116-2 remain outside the case body.

Figure 4E:
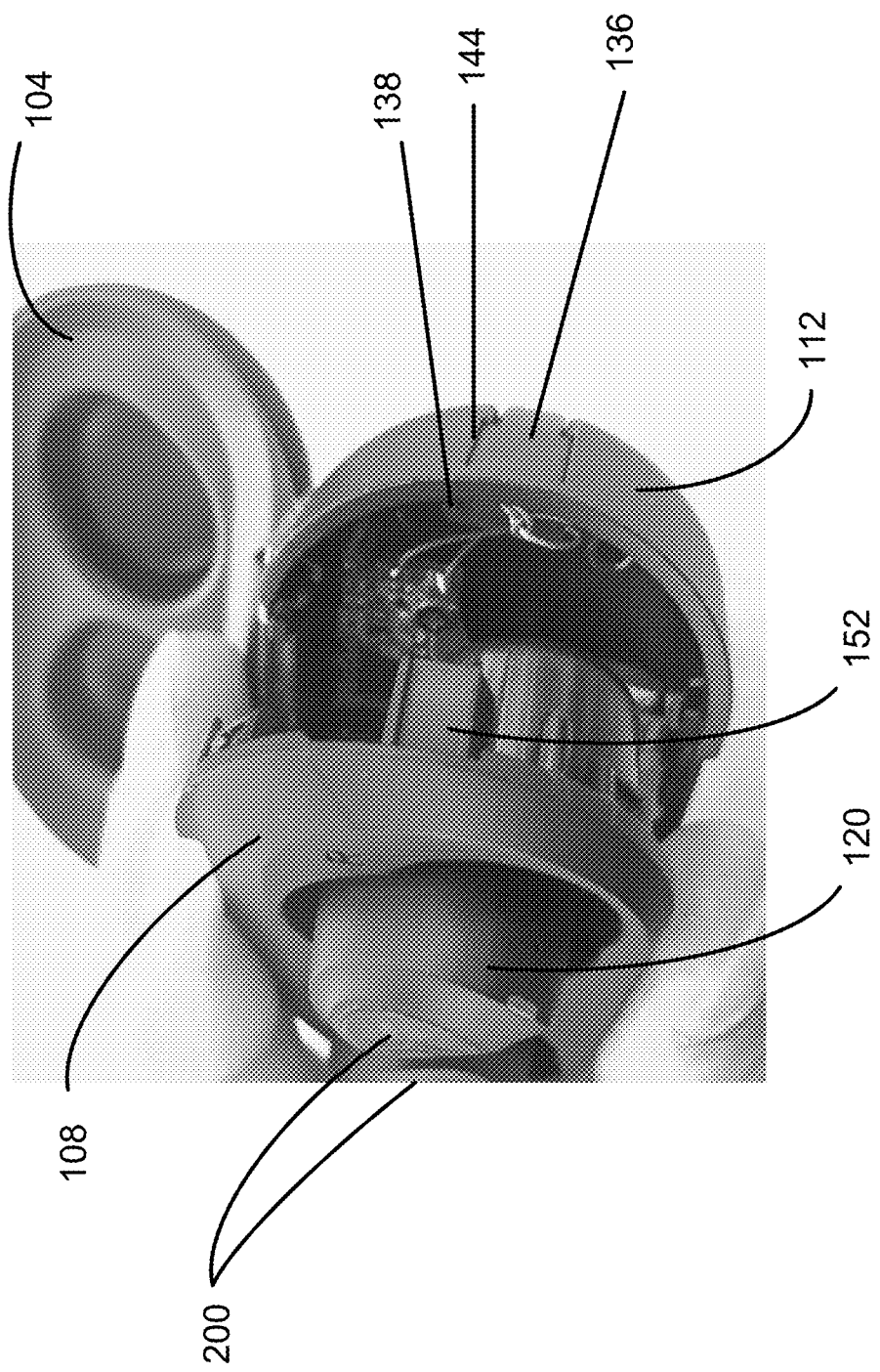

FIG. 4E depicts a step of attaching the upper section 108 to the lower section 112 of the case body. In this photo, the top cover 104 has been already attached to one edge portion of the lower section 112; the pair of earbuds 200 are accommodated in the respective sockets 120; and the USB cable 116 is in the folded position having the distal end portion 116-1 and the cable body 116-2 fit in the recessed area 128 that is formed on the exterior bottom surface and on the exterior side surface contiguously, of the lower section 112 of the case body. The dimensions of the patch section 136 of the SR element are configured to have the outer surface of the patch section 136 flush with the exterior surface of the case body around the opening 144.

Once the SR element is positioned by fitting the patch section 136 in the opening 144, the flange section 138 retained inside provides resilience to a pulling force applied from outside to the proximal end portion 116-3, holding the SR element in position. However, this configuration is not resilient to a pushing force from outside, and the SR element may likely be snapped away from the opening 144 toward the inner space of the case body when the pushing force is applied. A fixture 152 is formed as a part of the upper section 108, the part extruding downward. The fixture 152 is shaped and dimensioned to fit over the proximal end portion 116-3 including the SR element in the inner space so as to hold the proximal end portion 116-3, including the SR element, in position once the upper section 104 of the case body is attached to the lower section 112. Therefore, the proximal end portion 116-3 will stay secured in position with the opening 144 by the fixture 152, even a pushing force or pressure is applied from outside to the proximal end portion 116-3 of the built-in USB cable 116.

The order of steps in the assembly process described above may not have to be the order that is described, unless otherwise specified. Some steps can be combined, interchanged or sequenced differently depending on efficiency of assembly, convenience of applications or any other scenarios. In summary, the present process of assembling a charging case having a built-in USB cable includes at least the following key steps: fabricating a USB cable comprising a distal end portion including a USB connector, a cable body housing electrical wires coupled to the USB connector, and a proximal end portion including a SR element comprising a patch section and a flange section formed based on plastic molding, wherein at least one dimension of the flange section is configured to be larger than the corresponding dimension of the patch section; fabricating a lower section of a case body to house at least a battery and a PCB mounted with an electrical circuitry for performing at least power management and charging functions, wherein a recessed area is formed on an exterior surface of the case body, the recessed area being shaped and dimensioned for the distal end portion and the cable body to fit in, and wherein an opening is formed in a housing wall of the case body at a location adjacent to the recessed area, the opening being shaped and dimensioned for the patch section to fit in; fabricating an upper section of the case body, including forming a pair of sockets to accommodate the pair of earbuds, respectively, and forming a fixture extruding downward; inserting the proximal end portion through the opening to guide the electrical wires extending out from the proximal end portion into the inner space; soldering end portions of the electrical wires onto the PCB housed in the lower section; snapping the patch section in the opening and placing the flange section in the inner space against an inner surface around the opening; and attaching the upper section to the lower section, including placing the fixture against the proximal end portion in the inner space to hold the proximal end portion in position with the opening.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be exercised from the combination, and the claimed combination may be directed to a subcombination or a variation of a subcombination.

What is claimed is:

1. A charging case for charging and storing a pair of earbuds, the charging case comprising:
   a case body having an upper section and a lower section, the lower section housing at least a battery and a printed circuit board (PCB) mounted with an electrical circuitry for at least performing power management and charging functions, the upper section being formed to have a pair of sockets to accommodate the pair of earbuds, respectively; and
   a universal serial bus (USB) cable comprising a distal end portion including a USB connector configured to be plugged in a corresponding USB port in a host device for charging the battery, a cable body housing electrical wires coupled to the USB connector, and a proximal end portion non-removably attached to the case body for guiding the electrical wires into an inner space of the case body where end portions of the electrical wires are soldered onto the PCB;
   wherein a recessed area is formed on an exterior surface of the case body, the recessed area being configured for the cable body and the distal end portion to fit in, allowing for folding and storing the attached USB cable while not in use, and
   wherein the proximal end portion includes a strain relief (SR) element comprising a patch section and a flange section, the patch section being shaped and dimensioned to fit in an opening formed in a housing wall of the case body at a location adjacent to the recesses area, wherein at least one dimension of the flange section is configured to be larger than a corresponding dimension of the patch section.

2. The charging case of claim 1, wherein
   the patch section is fit and positioned in the opening to have an outer surface flush with the exterior surface of the case body around the opening; and
   the flange section is positioned in the inner space against an inner surface of the case body around the opening.

3. The charging case of claim 1, wherein
   the upper section includes a fixture formed to extrude downward, the fixture being shaped and dimensioned to fit over the proximal end portion in the inner space to hold the proximal end portion in position with the opening.

4. The charging case of claim 1, wherein
   the recessed area is shaped as a groove with dimensions that allow the distal end portion and the cable body to fit in to have exposed outer surfaces thereof being flush with or lower than the exterior surface of the case body around the recessed area when the attached USB cable is folded and accommodated in the recessed area.

5. The charging case of claim 1, wherein
   the USB connector is a double-sided reversible USB Type-A connector.

6. The charging case of claim 1, wherein
   a plurality of charging pins are mounted on the PCB in the lower section, the plurality of charging pins having end portions protruding into the pair of sockets to be used for charging the pair of earbuds upon contact with corresponding charging pins included in the pair of earbuds.

7. The charging case of claim 1, wherein
   the lower section of the case body includes a plurality of LED lights coupled to the PCB and configured to indicate a power status when a top cover is opened, the top cover being attached at one edge portion of the upper section of the case body and electronically coupled to the PCB.

8. The charging case of claim 1, wherein
   the recessed area is formed on an exterior bottom surface, on an exterior side surface, or on the exterior bottom surface and the exterior side surface contiguously.

9. A process of assembling a charging case having a built-in universal serial bus (USB) cable, the process comprising:
   fabricating a USB cable comprising a distal end portion including a USB connector, a cable body housing electrical wires coupled to the USB connector, and a proximal end portion including a strain relief (SR) element comprising a patch section and a flange section, wherein at least one dimension of the flange section is configured to be larger than a corresponding dimension of the patch section;
   fabricating an upper section of a case body, including forming a pair of sockets to accommodate the pair of earbuds, respectively, and forming a fixture extruding downward;
   fabricating a lower section of the case body to house at least a battery and a printed circuit board (PCB) mounted with an electrical circuitry for performing at least power management and charging functions, wherein a recessed area is formed on an exterior surface of the case body, the recessed area being shaped and dimensioned for the distal end portion and the cable body to fit in, and wherein an opening is formed in a housing wall of the case body at a location adjacent to the recessed area, the opening being shaped and dimensioned for the patch section to fit in;

inserting the proximal end portion through the opening to guide the electrical wires extending out from the proximal end portion into an inner space of the case body;

soldering end portions of the electrical wires onto the PCB housed in the lower section;

snapping the patch section in the opening and placing the flange section in the inner space against an inner surface of the case body around the opening; and attaching the upper section to the lower section, including placing the fixture against the proximal end portion in the inner space to hold the proximal end portion in position with the opening.

10. The process of claim 9, wherein
the recessed area is shaped as a groove with dimensions that allow the distal end portion and the cable body to fit in to have exposed outer surfaces thereof being flush with or lower than the exterior surface of the case body around the recessed area when the attached USB cable is folded and accommodated in the recessed area.

11. The process of claim 9, further comprising:
attaching a top cover to one edge portion of the upper section of the case body and electronically coupling it to the PCB housed in the lower section of the case body.

12. The process of claim 11, further comprising:
including with the lower section a plurality of LED lights coupled to the PCB, configured to indicate a power status when the top cover is opened.

\* \* \* \* \*